(12) United States Patent
Poppe et al.

(10) Patent No.: US 9,018,330 B2
(45) Date of Patent: *Apr. 28, 2015

(54) USE OF CURABLE MIXTURES COMPRISING SILANE GROUP-CONTAINING COMPOUNDS AND PHOSPHONIC ACID DIESTER OR DIPHOSPHONIC ACID DIESTER AS ADHESIVES

(75) Inventors: Andreas Poppe, Sendenhorst (DE); Guido Schulze-Finkenbrink, Münster (DE)

(73) Assignee: BASF Coatings GmbH, Munster (DE)

( * ) Notice: Subject to any disclaimer, the term of this patent is extended or adjusted under 35 U.S.C. 154(b) by 1305 days.

This patent is subject to a terminal disclaimer.

(21) Appl. No.: 12/302,534

(22) PCT Filed: Jan. 26, 2007

(86) PCT No.: PCT/EP2007/000660
§ 371 (c)(1),
(2), (4) Date: May 14, 2009

(87) PCT Pub. No.: WO2007/137632
PCT Pub. Date: Dec. 6, 2007

(65) Prior Publication Data
US 2009/0223631 A1   Sep. 10, 2009

(30) Foreign Application Priority Data
May 29, 2006 (DE) .......................... 10 2006 024 823

(51) Int. Cl.
| | |
|---|---|
| *C08G 77/26* | (2006.01) |
| *C09D 7/12* | (2006.01) |
| *C08G 18/28* | (2006.01) |
| *C08G 18/62* | (2006.01) |
| *C08K 5/5333* | (2006.01) |
| *C08K 5/5455* | (2006.01) |
| *C09D 5/00* | (2006.01) |
| *C08K 5/544* | (2006.01) |

(52) U.S. Cl.
CPC .............. *C09D 7/1233* (2013.01); *Y10T 156/10* (2015.01); *C08G 18/289* (2013.01); *C08G 18/6225* (2013.01); *C08K 5/5333* (2013.01); *C08K 5/544* (2013.01); *C08K 5/5455* (2013.01); *C09D 5/002* (2013.01)

(58) Field of Classification Search
USPC ................................................ 528/28, 398
See application file for complete search history.

(56) References Cited

U.S. PATENT DOCUMENTS

| | | |
|---|---|---|
| 3,251,785 A | 5/1966 | Anderson |
| 3,525,705 A | 8/1970 | Harowitz |
| 3,542,718 A | 11/1970 | Davis et al. |
| 3,746,572 A | 7/1973 | Weil et al. |
| 4,419,513 A | 12/1983 | Breidenbach et al. |
| 4,454,317 A | 6/1984 | Disteldorf et al. |
| 4,547,397 A | 10/1985 | Burzynski et al. |
| 4,631,142 A | 12/1986 | Sturtz |
| 4,801,675 A | 1/1989 | Pedain et al. |
| 5,258,482 A | 11/1993 | Jacobs et al. |
| 5,290,902 A | 3/1994 | Jacobs et al. |
| 5,679,804 A | 10/1997 | Ditrich et al. |
| 5,728,779 A | 3/1998 | van de Werff et al. |
| 5,817,732 A * | 10/1998 | Asahina et al. ................. 528/45 |
| 6,111,002 A | 8/2000 | Doring et al. |
| 6,392,006 B1 | 5/2002 | Van Benthem et al. |
| 7,078,474 B2 | 7/2006 | Hermann et al. |
| 8,013,099 B2 | 9/2011 | Poppe et al. |
| 8,138,249 B2 | 3/2012 | Taniguchi et al. |
| 2003/0176537 A1 | 9/2003 | Chaiko |
| 2004/0077801 A1 | 4/2004 | Feola et al. |
| 2005/0074617 A1 | 4/2005 | Lin et al. |
| 2006/0009606 A1 | 1/2006 | Hermann et al. |
| 2006/0156960 A1 | 7/2006 | Wombacher et al. |
| 2008/0245998 A1 | 10/2008 | Poppe et al. |
| 2008/0245999 A1 | 10/2008 | Poppe et al. |
| 2010/0015344 A1 | 1/2010 | Groenewolt et al. |

FOREIGN PATENT DOCUMENTS

| | | |
|---|---|---|
| CA | 2163591 A1 | 6/1996 |
| DE | 2559259 | 7/1977 |
| DE | 2809588 A1 | 11/1978 |
| DE | 4015155 A1 | 11/1991 |
| DE | 4024204 A1 | 2/1992 |
| DE | 4229183 A1 | 3/1994 |
| DE | 4344063 C1 | 6/1995 |

(Continued)

OTHER PUBLICATIONS

International Search Report for PCT/EP2007/000660 dated Oct. 25, 2007.
Written Opinion for PCT/EP2007/000660 filed Jan. 26, 2007.
International Preliminary Report for PCT/EP2007/000660 dated Jan. 20, 2009.
Co-Pending U.S. Appl. No. 12/067,673 with 371(c) date of Mar. 21, 2008 published as US20080245998A1, previously cited.
CAS Registry file search for Dimethyl Methylphosphonate.
CAS Registry file search for Diphosphonic acid.
Hohenesche et al., Journal of Chromatography A, 1025 (2004) 177-187.

(Continued)

Primary Examiner — Kuo-Liang Peng
(74) Attorney, Agent, or Firm — Cantor Colburn LLP

(57) ABSTRACT

The use of curable mixtures comprising
(A) at least one phosphonic diester and/or at least one diphosphonic diester and
(B) at least one compound containing at least two condensable silane groups,
as coupling agents, particularly as coupling agents in laminates comprising at least one substrate, at least one coating, at least one adhesive layer, and at least one sheet, and also a new process for producing such laminates using the coupling agents, the laminates which are producible using the coupling agents, and thermally curable mixtures comprising the coupling agents and at least one thermally curable polyester (C).

17 Claims, No Drawings

(56) References Cited

FOREIGN PATENT DOCUMENTS

| | | |
|---|---|---|
| DE | 19650478 A1 | 6/1998 |
| DE | 19828935 A1 | 12/1999 |
| DE | 19924170 A1 | 11/2000 |
| DE | 19938758 A1 | 2/2001 |
| DE | 19948004 A1 | 7/2001 |
| DE | 10051485 A1 | 4/2002 |
| DE | 10132654 A1 | 10/2002 |
| DE | 10202819 C1 | 8/2003 |
| DE | 102004060966 A1 | 6/2006 |
| DE | 102005045228 A1 | 4/2007 |
| EP | 0183976 A1 | 6/1986 |
| EP | 0267689 A2 | 5/1988 |
| EP | 0303150 A2 | 2/1989 |
| EP | 0496208 A2 | 7/1992 |
| EP | 0531820 A1 | 8/1992 |
| EP | 0524500 A1 | 1/1993 |
| EP | 0566037 A2 | 10/1993 |
| EP | 0646608 A1 | 4/1995 |
| EP | 0649806 A1 | 4/1995 |
| EP | 0882748 A2 | 12/1998 |
| EP | 0976723 A2 | 2/2000 |
| EP | 1193278 A1 | 8/2001 |
| EP | 1134266 A1 | 9/2001 |
| EP | 1195397 A1 | 4/2002 |
| EP | 1475360 A1 | 5/2003 |
| JP | 62260868 A | 11/1987 |
| JP | H01188571 A | 7/1989 |
| JP | H0858013 A | 3/1996 |
| JP | H11507399 A | 6/1999 |
| JP | 2000103959 A | 4/2000 |
| JP | 2001262082 A | 9/2001 |
| JP | 2002179688 A | 6/2002 |
| WO | WO9916810 A1 | 4/1999 |
| WO | WO00/31194 A1 | 6/2000 |
| WO | WO00/37520 A1 | 6/2000 |
| WO | 0055270 A1 | 9/2000 |
| WO | WO0064763 A1 | 11/2000 |
| WO | WO0109231 A1 | 2/2001 |
| WO | WO0109259 A1 | 2/2001 |
| WO | WO0109260 A1 | 2/2001 |
| WO | WO0109261 A1 | 2/2001 |
| WO | WO03/011992 A2 | 2/2003 |
| WO | WO2004072189 A2 | 8/2004 |
| WO | WO2005/105938 A1 | 11/2005 |
| WO | WO2007/033786 A1 | 3/2007 |
| WO | WO2007033826 A1 | 3/2007 |

OTHER PUBLICATIONS

International Preliminary Report on Patentability for International Application No. PCT/EP2006/009177 dated Apr. 8, 2008.
International Preliminary Report (English Translation) dated Apr. 8, 2008 for International Application No. PCT/EP2006/008908.
International Search Report for PCT/EP2008/002291 dated Jul. 1, 2008.
International Search Report dated Sep. 13, 2006 for International Application No. PCT/EP2006/008908.
International Search Report Dated Nov. 24, 2006, International Application No. PCT/EP2006/009177.
International Preliminary Report on Patentability date Sep. 29, 2009 for International Application No. PCT/EP2008/002291.
CAS Registry file search for Neopentyl Methylphosphonate.
CAS Registry file search for Phosphonic acid.
Written opinion for PCT/EP2008/02291 filed on Mar. 20, 2008.
Written Opinion of the International Searching Authority dated Sep. 13, 2006 for International Application No. PCT/EP2006/008908.
Written Opinion of International Searching Authority Dated Nov. 24, 2006, International Application No. PCT/EP2006/009177.

* cited by examiner

USE OF CURABLE MIXTURES COMPRISING SILANE GROUP-CONTAINING COMPOUNDS AND PHOSPHONIC ACID DIESTER OR DIPHOSPHONIC ACID DIESTER AS ADHESIVES

CROSS REFERENCE TO RELATED APPLICATIONS

This application is a National Phase Application of Patent Application PCT/EP2007/000660 filed on 26 Jan. 2007, which claims priority to DE 10 2006 024 823.6, filed 29 May 2006.

FIELD OF THE INVENTION

The present invention relates to the new use of curable mixtures comprising silane compounds and also phosphonic diesters and/or diphosphonic diesters as coupling agents, particularly as coupling agents in laminates comprising at least one substrate, at least one coating, at least one adhesive layer, and at least one sheet.

The present invention further relates to a new process for producing new laminates comprising at least one substrate, at least one coating, at least one adhesive layer, and at least one sheet, the process being carried out using curable mixtures comprising silane compounds and also phosphonic diesters and/or diphosphonic diesters.

The present invention additionally relates to new laminates comprising at least one substrate, at least one coating, at least one adhesive layer, and at least one sheet which are producible using curable mixtures comprising silane compounds and also phosphonic diesters and/or diphosphonic diesters.

The present invention relates not least to new thermally curable mixtures which comprise polyesters and curable mixtures comprising silane compounds and also phosphonic diesters and/or diphosphonic diesters.

BACKGROUND

Phosphonic diesters are esters of phosphonic acid [HP(O)(OH)$_2$], which is tautomeric with phosphorous acid [P(OH)$_3$]. The phosphonic diesters are frequently referred to, not entirely correctly, as secondary phosphates. Nevertheless the true derivatives of phosphorous acid are only the triesters.

Diphosphonic diesters are the diesters of the diphosphonic acid:

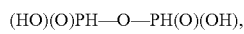

(HO)(O)PH—O—PH(O)(OH), which formerly was also referred to as diphosphorous acid (cf. in this regard Römpp Lexikon der Chemie, Georg Thieme Verlag, Stuttgart, N.Y., 1990, "Phosphites", "Phosphonates", "Phosphonic acid", "Diethyl phosphite", and "Dimethyl phosphite").

Curable mixtures, especially coating materials, particularly clearcoat materials, which comprise polyester binders are known to be used in automotive OEM finishing since they produce thermally cured mixtures, especially coatings, particularly clearcoats, which have surfaces with an outstanding overall appearance. In laminates comprising at least one substrate, at least one coating, at least one adhesive layer, and at least one sheet, however, they leave something to be desired in their adhesion effect.

International patent application WO 03/011992 proposes improving the adhesion in multicoat paint systems through the use of carbinol-functional siloxanes which have been reacted with boric acid. Coupling agents of that kind, however, are surface-active, and so interact with other additives, especially silicone additives, and so impair the flow of the coatings.

Specifically in the context of automotive finishes the American patent application US 2005/0074617 describes the use of silane-containing acrylate copolymers which in addition may also contain hydroxyl groups. A strong interaction or influence of the silane groups on or with other functional groups, especially hydroxyl groups, is described. These interactions entail restrictions to the degrees of freedom affecting the resin synthesis and/or affecting the formulation of clearcoat materials for automotive OEM finishing.

The use of silane-containing coupling agents is indeed known in the prior art—see, for example, German patent applications DE 100 51 485 A1, DE 28 09 588 A or DE 25 59 259 A or the international patent application WO 2005/105938—but the action of these substances alone, without additional activators, is limited and is inadequate especially for particular applications in the field of polyester-containing two-component clearcoat materials for automotive OEM finishing.

German patent application DE 10 2005 045 228.0-44, unpublished at the priority date of the present specification, describes how silane-containing mixtures are able, with suitable additions based on phosphonic acid derivatives, to form particularly stable three-dimensional networks as reaction products. The coupling agent utility is not described.

The object on which the present invention is based is to find new coupling agents, especially new coupling agents for laminates comprising at least one substrate, at least one coating, at least one adhesive layer, and at least one sheet, which no longer have the disadvantages of the prior art.

The new coupling agents ought to produce outstanding adhesion within the coatings, so that when laminates comprising at least one substrate, at least one coating, at least one adhesive layer, and at least one sheet are subjected to mechanical load there is no delamination between substrate and coating, within the coating, or between coating and adhesive layer, but instead only a cohesive fracture within the adhesive layer.

The new coupling agents ought also to allow the simple and precisely reproducible production of laminates comprising at least one substrate, at least one coating, at least one adhesive layer, and at least one sheet.

Furthermore, the new coupling agents ought to be suitable for producing thermally curable mixtures, especially coating materials, particularly clearcoat materials, which are stable on storage and/or have a long pot life or processing life.

Not least the new thermally curable mixtures, especially the coating materials, particularly the clearcoat materials, ought to give cured materials, especially coatings, particularly clearcoats, which are particularly hard, abrasion-resistant, highly scratch-resistant, particularly chemical-resistant, and etch resistant, and which also, as clearcoats, are of particularly high gloss and clarity.

The new clearcoats ought in particular, as part of multicoat paint systems, to exhibit outstanding adhesion properties, so that in laminates comprising at least one substrate, at least one multicoat paint system with at least one new clearcoat, at least one adhesive layer, and at least one sheet the effect of mechanical load is accompanied only by cohesive fracture within the adhesive layer.

SUMMARY

Found accordingly has been the new use of the curable mixtures (A/B) comprising (A) at least one phosphonic diester and/or at least one diphosphonic diester and
(B) at least one compound containing at least two condensable silane groups
as coupling agents, this being referred to below as "inventive use".

Also found has been the new process for producing laminates comprising at least one substrate, at least one coating, at least one adhesive layer, and at least one sheet, which makes use of the inventive use and is referred to below as "process of the invention".

Additionally found have been the new laminates comprising at least one substrate, at least one coating, at least one adhesive layer, and at least one sheet, which are producible utilizing the inventive use and which are referred to below as "laminates of the invention".

Found not least have been the new thermally curable mixtures which comprise a curable mixture (A/B) in accordance with the inventive use and at least one thermally curable polyester (C) and which are referred to below as "mixtures of the invention".

Further subject matter of the invention will become apparent from the description.

DETAILED DESCRIPTION OF THE INVENTION

In the light of the prior art it was surprising and unforeseeable for the skilled worker that the object on which the present invention was based could be achieved by means of the inventive use, the process of the invention, the laminates of the invention, and the mixtures of the invention.

In particular it was surprising that the coupling agents for use in accordance with the inventive use brought about outstanding adhesion within the coatings, so that when the laminates of the invention comprising at least one substrate, at least one coating, at least one adhesive layer, and at least one sheet were subjected to mechanical load there was no delamination between substrate and coating, within the coating, and between coating and adhesive layer, but instead only cohesive fracture within the adhesive layer.

Furthermore, the inventive use allowed the simple and precisely reproducible production of laminates of the invention with the process of the invention.

Furthermore, it was possible, on the basis of the inventive use, to provide the mixtures of the invention, in particular the coating materials of the invention, particularly the clearcoat materials of the invention, which were stable on storage and/or had a long pot life or processing life.

The inventive mixtures, in particular the coating materials of the invention, especially the clearcoat materials of the invention, produced, not least, new cured materials, especially new coatings, particularly new clearcoats, which were particularly hard, abrasion-resistant, highly scratch-resistant, particularly chemical-resistant, and etch-resistant, and which also, as clearcoats, were of particularly high gloss and clarity.

In particular, as part of new multicoat paint systems, the clearcoats of the invention exhibited outstanding adhesion properties, so that in the laminates of the invention comprising at least one substrate, at least one multicoat paint system with at least one clearcoat of the invention, at least one adhesive layer, and at least one sheet, mechanical load was accompanied only by cohesive fracture within the adhesive layer.

The inventive use relates to the use of curable mixtures (A/B) as coupling agents.

"Coupling agent" or "adhesion promoter" is a collective term for all substances which lead to an improvement in the strength of adhesion of materials which are to be combined with one another (e.g., coatings on various substrates such as metal, plastic, wood, glass, etc.) (cf. Römpp Lexikon Lacke und Druckfarben, Georg Thieme Verlag, Stuttgart, N.Y., 1998, "Adhesion Promoters").

The curable mixtures (A/B) for use in accordance with the invention comprise essentially the constituents (A) and (B) or they consist of these constituents.

"Essentially" means that the curable mixtures (A/B) comprise only such additional substances, and in such an amount, that the coupling effect is not impaired. The additional substances may be selected from the additives (D) described below. Preference is given to using organic solvents and stabilizers. Particular preference is given to employing glycols, more preferably propylene glycol, butyl glycol, and homologs having 5 to 10 carbon atoms in the molecule, and, in particular, propylene glycol and butyl glycol, as stabilizers. With particular preference the organic solvents and stabilizers are used in an amount of 5% to 50% by weight, in particular 10% to 40% by weight, based in each case on a curable mixture (A/B/D).

For the inventive use the phosphonic diesters and the diphosphonic diesters (A) are preferably selected from the group consisting of acyclic phosphonic diesters, cyclic phosphonic diesters, acyclic diphosphonic diesters, and cyclic diphosphonic diesters.

Preferably the acyclic phosphonic diesters (A) are selected from the group consisting of acyclic phosphonic diesters (A) of the general formula I:

In the general formula I the radicals $R^1$ and $R^2$ are identical to or different from one another; preferably they are identical.

The radicals $R^1$ and $R^2$ are selected from the group consisting of:

substituted and unsubstituted alkyl- having 1 to 20, preferably 2 to 16, and in particular 2 to 10 carbon atoms, cycloalkyl- having 3 to 20, preferably 3 to 16, and in particular 3 to 10 carbon atoms, and aryl- having 5 to 20, preferably 6 to 14, and in particular 6 to 10 carbon atoms, the hyphen symbolizing in each case the covalent bond between a carbon atom of the radical $R^1$ or $R^2$ and the oxygen atom of the O—P group;

substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl, and aryl groups therein each having the aforementioned number of carbon atoms, and the hyphen symbolizing in each case the covalent bond between a carbon atom of the radical $R^1$ and $R^2$ and the oxygen atom of the O—P group; and substituted and unsubstituted radical- of the aforementioned kind, containing at least one, especially one, heteroatom selected from the group consisting of oxygen atom, sulfur atom, nitrogen atom, phosphorus atom, and silicon atom, especially oxygen atom, sulfur atom, and nitrogen atom, the hyphen symbolizing the covalent bond between a carbon atom of the radical and the oxygen atom of the O—P group.

Preferably the cyclic phosphonic diesters (A) are selected from the group consisting of the cyclic phosphonic diesters (A) of the general formula II:

(II)

In the general formula II the radicals $R^3$ and $R^4$ are identical to or different from one another; preferably they are identical.

The radicals $R^3$ and $R^4$ are selected from the group consisting of:
- substituted and unsubstituted divalent alkyl- having 1 to 20, preferably 1 to 10, and in particular 1 to 6 carbon atoms, cycloalkyl- having 3 to 20, preferably 3 to 10, and in particular 3 to 6 carbon atoms, and aryl- having 5 to 20, preferably 6 to 14, and in particular 6 to 10 carbon atoms, the hyphen symbolizing in each case the covalent bond between a carbon atom of the radical $R^3$ or $R^4$ and the oxygen atom of the O—P group;
- substituted and unsubstituted divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl, and aryl groups therein each containing the aforementioned number of carbon atoms, and the hyphen symbolizing in each case the covalent bond between a carbon atom of the radical $R^3$ and $R^4$ and the oxygen atom of the O—P group; and
- substituted and unsubstituted divalent radical- of the aforementioned kind, containing at least one, especially one, heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group.

In the general formula II the variable Z is
- a covalent bond between an atom of the radical $R^3$ and an atom of the radical $R^4$;
- a divalent linking group selected from the group consisting of oxygen atom, substituted, especially oxygen-substituted, and unsubstituted sulfur atom, substituted, especially alkyl-substituted, nitrogen atom, substituted, especially oxygen-substituted, phosphorus atom, and substituted, especially alkyl- and alkoxy-substituted, silicon atom, especially oxygen atom; or
- a divalent linking group selected from the group consisting of substituted and unsubstituted alkyl having 1 to 10, preferably 1 to 6, and in particular 1 to 4 carbon atoms, cycloalkyl having 3 to 10, preferably 3 to 6, and in particular 6 carbon atoms, and aryl having 5 to 10 and in particular 6 carbon atoms, these radicals being free from heteroatoms or containing at least one heteroatom selected from the group consisting of oxygen atom, sulfur atom, nitrogen atom, phosphorus atom, and silicon atom, especially oxygen atom, sulfur atom, and nitrogen atom.

Preferably the acyclic diphosphonic diesters (A) are selected from the group consisting of the acyclic diphosphonic diesters (A) of the general formula III:

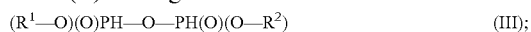
(III);

in which the variables are as defined above.

Preferably the cyclic diphosphonic diesters (A) are selected from the group consisting of the cyclic diphosphonic diesters (A) of the general formula IV:

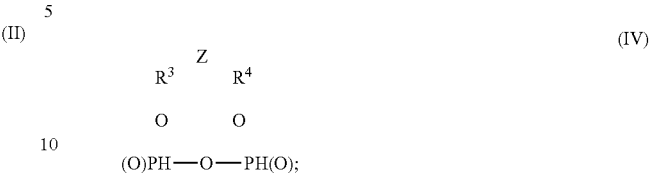
(IV)

in which the variables are as defined above.

Suitable substituents for the radicals $R^1$, $R^2$, $R^3$, and $R^4$ include all groups and atoms which do not impair the action of the phosphonic diesters and of the diphosphonic diesters (A), do not inhibit the curing reactions in the mixtures of the invention, do not lead to unwanted side reactions, and do not give rise to toxic effects. Examples of suitable substituents are halogen atoms, nitrile groups or nitro groups, preferably halogen atoms, especially fluorine atoms, chlorine atoms, and bromine atoms.

Preferably the radicals $R^1$, $R^2$, $R^3$, and $R^4$ are unsubstituted.

Preferably the radicals $R^1$ and $R^2$ are selected from the group consisting of phenyl, methyl, and ethyl. More preferably phenyl is used.

Preferably the acyclic phosphonic diesters (A) of the general formula I are used.

More preferably the radicals $R^1$ and $R^2$ of the acyclic phosphonic diesters (A) of the general formula I are selected from the group consisting of phenyl, methyl, and ethyl. In particular phenyl is used.

An example of an exceptionally suitable phosphonic diester (A) of the general formula I is diphenyl phosphonate, sometimes referred to by those in the art (not entirely correctly) as diphenyl phosphite.

The mixtures of the invention comprise at least one, especially one, compound (B), containing at least two, in particular at least three, condensable silane groups.

In a given compound (B) one basic structure is linked to at least two, in particular at least three, condensable silane groups.

The condensable silane groups preferably have the general formula V:

(V)

in which the index and the variables have the following definitions:

m is an integer from 1 to 3, especially 3;
$R^5$ is a monovalent condensable atom or monovalent condensable organic radical; and
$R^6$ is a monovalent inert organic radical.

Preferably the monovalent condensable atoms are selected from the group consisting of hydrogen atoms, fluorine atoms, chlorine atoms, and bromine atoms.

Preferably the monovalent condensable organic radicals $R^5$ are selected from the group consisting of hydroxyl groups and the groups of the general formula VI:

(VI), in which the variable $R^7$ is a divalent linking atom or a divalent linking functional group and $R^6$ is as defined above.

Preferably the monovalent inert organic radicals $R^6$ are selected from the group consisting of monovalent substituted and unsubstituted alkyl preferably having 1 to 20, more preferably 2 to 16, and in particular 2 to 10 carbon atoms, cycloalkyl- preferably having 3 to 20, more preferably 3 to 16, and in particular 3 to 10 carbon atoms, and aryl- preferably having 5 to 20, more preferably 6 to 14, and in particular 6 to 10 carbon atoms;

monovalent substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups therein preferably each containing the aforementioned number of carbon atoms; and monovalent substituted and unsubstituted radical of the aforementioned kind, containing at least one, especially one, heteroatom, selected from the group consisting of oxygen atom, sulfur atom, nitrogen atom, phosphorous atom, and silicon atom, especially oxygen atom, sulfur atom, and nitrogen atom;

suitable substituents being those described above.

Preferably the divalent linking atoms $R^7$ are selected from the group consisting of oxygen atoms and sulfur atoms, especially oxygen atoms.

Preferably the divalent linking functional groups $R^7$ are selected from the group consisting of —C(=$R^8$)—, —$R^7$—C(=$R^8$)—, —C(=$R^8$)—$R^7$—, —NH—, and —N(—$R^6$)—, in which the variable $R^8$ is a divalent atom, in which the variable $R^7$ is as defined above and in particular is an oxygen atom or a sulfur atom and the variable $R^6$ is as defined above, and where "=" symbolizes a double bond, and the covalent bond symbolized by the left-hand outer supplementary hyphen links the group of the general formula VI to the silicon atom of the group of the general formula V.

In particular the divalent atoms $R^8$ are selected from the group consisting of oxygen atoms and sulfur atoms, especially oxygen atoms.

With very particular preference the divalent linking atoms $R^7$ are used.

In particular the silane groups of the general formula V are selected from the group consisting of trimethoxysilyl and triethoxysilyl groups.

The compounds (B) may be monomeric, oligomeric or polymeric in construction, i.e., they may have a monomeric, an oligomeric or a polymeric base structure.

"Monomeric" means that the compound (B) in question or its base structure is composed essentially of one structural unit or of two structural units, which may be the same as or different from one another.

"Oligomeric" means that the compound (B) in question or its base structure is composed on average of 3 to 12 monomeric structural units, which may be the same as or different from one another.

"Polymeric" means that the compound (B) in question or its base structure is composed on average of at least 8 monomeric structural units, which may be the same as or different from one another.

Whether a compound (B) or its base structure which is composed on average of 8 to 12 monomeric structural units is regarded by the skilled worker as an oligomer or as a polymer depends in particular on the number-average and mass-average molecular weight of such a compound (B) or base structure. Where the molecular weights are comparatively high it will be referred to as a polymer; where they are comparatively low, as an oligomer.

The monomeric base structures of the compounds (B) derive from customary and known organic compounds of low molecular mass.

The oligomeric and polymeric base structures of the compounds (B) derive preferably from the customary and known, organic and organometallic oligomers and polymers. These may have any of a very wide variety of structures. By way of example they may be linear, star-shaped, comb-form or irregularly branched, dendrimeric or annular, and more than one of these structures may be present in one compound (B). The structures may exhibit a random and/or blockwise distribution of the monomeric structural units.

With preference the oligomeric and polymeric base structures of the compounds (B) derive from the customary and known oligomers and polymers preparable by free-radical, anionic or cationic addition polymerization of olefinically or acetylenically, preferably olefinically, unsaturated monomers, preparable by polycondensation, or preparable by polyaddition.

With particular preference the oligomeric and polymeric base structures of the compounds (B) derive from the customary and known polyolefins, polystyrenes, polyacrylonitriles, (meth)acrylate (co)polymers, polyesters, polyamides, polyphenylene oxides, and polyurethanes.

With particular preference the base structures of the compounds (B) contain at least one group and in particular at least two groups selected from the group consisting of the groups of the general formulae (VII 1), (VII 2), and (VII 3):

in which the variables $R^{10}$, $R^{11}$, and $R^{12}$ have the definition elucidated below in detail in connection with the general formula VII.

With very particular preference the compounds (B) have the general formula VII:

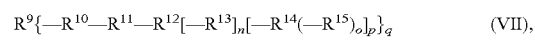

in which the indices and the variables have the following definitions:

n is 0 or 1;
o is 1, 2 or 3;
p is 1 or 2;
q is an integer from 1 to 10, with the proviso that o=2 or 3 and/or p=2 if q=1;
$R^9$ is an at least monovalent, preferably at least divalent, and in particular at least trivalent inert organic radical, with the proviso that o=2 or 3 and/or p=2 if $R^9$=a monovalent organic radical;
$R^{10}$ in the first alternative=group —NH—, with the proviso that
  (i) the groups $R^{12}$ are linked via the covalent bonds symbolized by the left-hand outer supplementary hyphens to the carbon atom of the group $R^{11}$ and are linked by the covalent bonds symbolized by the right-hand outer supplementary hyphens, by "<" or by "=" to the radicals $R^{14}$ or $R^{14}$ and $R^{13}$;
or
in the second alternative=groups $R^{12}$, with the provisos that
  (ii) the group $R^{12}$ linked directly to $R^{14}$=—NH— and
  (iii) the groups $R^{12}$ are linked to the carbon atom of the group $R^{11}$ via the covalent bonds symbolized by the left-hand outer supplementary hyphens and are linked to the radicals $R^9$ by the covalent bonds symbolized by the right-hand outer supplementary hyphens, by "<" or by "=";

$R^{11}$ is a group —C(=$R^3$)—, in which "=$R^8$" is as defined above;

$R^{12}$ is a divalent or trivalent atom selected from the group consisting of divalent linking atoms $R^7$ and trivalent nitrogen atoms —N< and —N=, in which "=" symbolizes a double bond; or a divalent or trivalent linking functional group selected from the group consisting of —NH—, —N(—$R^6$)—, —NH—C(=$R^8$)—, —NH[—C(=$R^8$)—]$_2$, —NH—C(=$R^8$)—NH—, —NH—C(=$R^8$)—$R^7$—, —NH—C(=$R^8$)—NH—C(=$R^8$)—$R^7$—, —$R^7$—N=, —$R^7$—NH—C(=$R^8$)—, and —NH—C(=$R^8$)—NH—N=C<, in which "=$R^8$", $R^7$, and $R^6$ are as defined above;

$R^{13}$ is a monovalent inert organic radical $R^6$ or group of the general formula VIII:

in which the index o is as defined above and the radicals $R^{14}$ and $R^{15}$ are as defined below;

$R^{14}$ is an at least divalent inert organic radical; and $R^{15}$ is a silane group of the general formula V.

Preferably at the least monovalent radicals $R^9$ are selected from the group consisting of at least monovalent substituted and unsubstituted alkyl preferably having 1 to 20, more preferably 2 to 16, and in particular 2 to 10 carbon atoms, cycloalkyl- preferably having 3 to 20, more preferably 3 to 16, and in particular 3 to 10 carbon atoms, and aryl- preferably having 5 to 20, more preferably 6 to 14, and in particular 6 to 10 carbon atoms;

at least monovalent substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups therein preferably each containing the aforementioned number of carbon atoms; and at least monovalent substituted and unsubstituted radical of the aforementioned kind, containing at least one, especially one, heteroatom, selected from the group consisting of oxygen atom, sulfur atom, nitrogen atom, phosphorous atom, and silicon atom, especially oxygen atom, sulfur atom, and nitrogen atom;

suitable substituents being those described above.

Preferably the radical $R^{10}$ is an —NH— group (=first alternative).

Preferably the radical $R^{11}$ is a —C(=O)— group.

Preferably the radicals $R^{12}$ are selected from the group consisting of trivalent nitrogen atoms —N< and divalent linking functional groups —N(—$R^6$)—, in which the variable $R^6$ is as defined above, preferably methyl, ethyl, propyl, isopropyl, n-butyl, isobutyl, sec-butyl, and tert-butyl, especially n-butyl.

Preferably the radicals $R^{12}$ are linked to the carbon atom of the group $R^{11}$ via the covalent bonds symbolized by the left-hand outer supplementary hyphens and to the radicals $R^{14}$ or $R^{14}$ and $R^{13}$ by the covalent bonds symbolized by the right-hand outer supplementary hyphens or by "<" (=first alternative).

Preferably the at least divalent, especially divalent, radicals $R^{14}$ are selected from the group consisting of at least divalent substituted and unsubstituted alkyl preferably having 1 to 20, more preferably 2 to 16, and in particular 2 to 10 carbon atoms, cycloalkyl- preferably having 3 to 20, more preferably 3 to 16, and in particular 3 to 10 carbon atoms, and aryl- preferably having 5 to 20, more preferably 6 to 14, and in particular 6 to 10 carbon atoms;

at least divalent substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups therein preferably each containing the aforementioned number of carbon atoms; and at least divalent substituted and unsubstituted radical of the aforementioned kind, containing at least one, especially one, heteroatom, selected from the group consisting of oxygen atom, sulfur atom, nitrogen atom, phosphorous atom, and silicon atom, especially oxygen atom, sulfur atom, and nitrogen atom;

suitable substituents being those described above. Use is made in particular of propane-1,3-diyl.

The compounds (B) described above can be prepared by the customary and known methods of organosilicon chemistry.

Preferably they are preparable by (a) in a first alternative reacting at least one compound of the general formula IX:

in which the index q and the variable $R^9$ are as defined above and $R^8$ is an oxygen atom or a sulfur atom, with at least one compound of the general formula X:

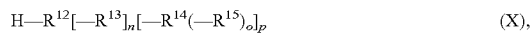

in which the indices and the variables are as defined above, or (b) in a second alternative reacting at least one compound of the general formula XI:

in which the index and the variables are as defined above, with at least one compound of the general formula XII:

in which the index and the variables are as defined above.

It is preferred to employ the first alternative (a).

In the case of the two alternatives (a) and (b) it is preferred to employ an equivalent ratio of the complementary reactive functional groups

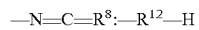

of close to 1, preferably 1.5:1 to 1:1.5, more preferably 1.3:1 to 1:1.3, and in particular 1.2:1 to 1:1.2.

Examples of suitable compounds of the general formula X are monoisocyanates, such as ethyl, propyl, butyl, pentyl, hexyl, heptyl, octyl, nonyl, decyl, undecyl, lauryl, cyclohexyl or phenyl isocyanate;

diisocyanates, such as tetramethylene 1,4-diisocyanate, hexamethylene 1,6-diisocyanate, 2,2,4-trimethylhexamethylene 1,6-diisocyanate, omega,omega'-dipropylether diisocyanate, cyclohexyl 1,4-diisocyanate, cyclohexyl 1,3-diisocyanate, cyclohexyl 1,2-diisocyanate, dicyclohexylmethane 4,4'-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)-benzene, isophorone diisocyanate, dicyclohexyldimethylmethane 4,4'-diisocyanate, tolylene 2,4-diisocyanate, tolylene 2,6-diisocyanate, diphenylmethane 4,4'-diisocyanate; and polyisocyanates, such as triisocyanates such as nonane triisocyanate (NTI) and also polyisocyanates based on the above-described diisocyanates and triisocyanates, especially oligomers which contain isocyanurate, biurete, allophanate, iminooxadiazinedione, urethane, carbodiimide, urea and/or uretdione groups, which are known for example from patents and patent applications CA 2,163,591 A 1, U.S. Pat. No. 4,419,513 A, U.S. Pat. No. 4,454,317 A, EP 0 646 608 A 1, U.S. Pat. No. 4,801,675 A, EP 0 183 976 A 1, DE 40 15 155 A 1, EP 0 303 150 A 1, EP 0 496 208 A 1, EP 0 524 500 A 1, EP 0 566 037 A 1, U.S. Pat. No. 5,258,482 A, U.S. Pat. No. 5,290,902 A, EP 0 649 806 A 1, DE 42 29 183 A 1 or EP 0 531 820 A 1, and which advantageously have an NCO functionality of 2.0-5.0, preferably of 2.2-4.0, in particular of 2.5-3.8;

the high-viscosity polyisocyanates of the kind described in German patent application DE 198 28 935 A 1; and also the polyisocyanates known from German patent application DE 199 24 170 A 1, column 2 lines 6 to 34, column 4 line 16 to column 6 line 62, from international patent applications WO 00/31194, page 11 line 30 to page 12 line 26, and WO 00/37520, page 5 line 4 to page 6 line 27, and from European patent application EP 0 976 723 A2, page 12 paragraph [0128] to page 22 paragraph [0284].

Examples of suitable compounds of the general formula XI are N,N-bis(3-trimethoxysilylpropan-1-yl)amine, N,N-bis(3-triethoxysilylpropan-1-yl)amine, N-(3-trimethoxysilylpropan-1-yl)-N-n-butylamine or N-(3-triethoxysilylpropan-1-yl)-N-n-butylamine.

Examples of suitable compounds of the general formula XII are the customary and known aliphatic, cycloaliphatic, aromatic, aliphatic-cycloaliphatic, aliphatic-aromatic or aliphatic-cycloaliphatic-aromatic alcohols, thiols, thioalcohols, phenols, amines, amino alcohols, amino thiols or amino thioalcohols containing at least one hydroxyl group, at least one thiol group and/or at least one primary and/or secondary amino group.

Examples of suitable compounds of the general formula XIII are 3-trimethoxysilylpropan-1-yl isocyanate or 3-triethoxysilylpropan-1-yl isocyanate.

In terms of method the preparation of the compounds (B) has no peculiarities but instead takes place with the aid of the customary and known methods and apparatus for the handling and reaction of polyisocyanates and organosilicon compounds, with the customary and known precautionary measures relating to the handling of polyisocyanates being taken.

In general the compounds of the general formula X and XI or XII and XIII, respectively, are reacted with one another until free isocyanate groups are no longer detectable in the reaction mixtures in question, using the customary and known methods for the qualitative and quantitative detection of isocyanate groups.

The amount of phosphonic diesters and/or diphosphonic diesters (A) in the curable mixtures (A/B) for use in accordance with the invention may vary very widely and is guided by the requirements of the case in hand, and so can be adapted optimally to them. Preferably the phosphonic diesters and/or diphosphonic diesters (A) are present in a curable mixture (A/B) in an amount of 1% to 40% by weight, preferably 2% to 30% by weight, and in particular 3% to 20% by weight, based in each case on the solids of the thermally curable mixture (A/B).

Similarly the amount of compounds (B) in the curable mixtures (A/B) for use in accordance with the invention may vary very widely and may be adapted optimally to the requirements of the case in hand. Preferably the compounds (B) are present in a thermally curable mixture (A/B) in an amount of 60% to 99% by weight, preferably 70% to 98% by weight, and in particular 80% to 97% by weight, based in each case on the solids of the thermally curable mixture (A/B).

The solids in this context equates to the sum of all the constituents of a curable mixture (A/B) which, following the removal of the volatile constituents, constitute the nonvolatile residue: a cured material, for example.

On account of their outstanding coupling action, the curable mixtures (A/B) can be used in the context of the inventive use for improving the coupling between any of a very wide variety of materials. With particular advantage they are used as coupling agents in the laminates of the invention comprising at least one substrate, at least one coating, at least one adhesive layer, and at least one sheet.

Here and below, a "sheet" is a planar, substantially planar, or three-dimensionally shaped, optically transparent, i.e., preferably transmissive for visible light, especially clear, optionally tinted molding, which may be composed of any of a very wide variety of materials, in particular of plastic or glass. The moldings in question are, in particular, laminated glass sheets. The laminated glass sheets are used in particular in the windows of means of transport, preferably motorized road vehicles, more preferably automobiles.

For producing the adhesive layer it is possible to use any of a very wide variety of adhesives. Examples of suitable adhesives, the forms in which they are employed, and the methods of their curing are known from German patent DE 102 02 819 C1, page 5 paragraphs [0058] and [0059]. The adhesives are preferably moisture-curing. In particular the adhesives comprise polyisocyanates.

The coating is preferably a paint system composed of one coat or of at least two coats. With preference the paint system is a multicoat paint system, in particular a multicoat paint system of the type typically used in automotive OEM finishing (cf. in this regard also German patent applications DE 199 38 758 A1, page 10 line 65 to page 12 line 51, and DE 199 48 004 A1, page 17 line 37 to page 19 line 22).

The substrate may be composed of any suitable material. The substrate is preferably composed of a material selected from the group consisting of metals, glasses, plastics, natural or synthetic minerals, ceramics, concrete, cement, clay, wood, paper, leather, textile, and composites of these materials, especially of metals and plastics. With preference the substrate is a motor vehicle body or a part thereof.

Within the laminate of the invention, the coupling agent for use in accordance with the invention is preferably in the coating. Where the coating is a multicoat paint system, the coupling agent is preferably in the layer immediately adjacent to the adhesive layer.

The laminate of the invention can be produced with the aid of customary and known processes. Preferably it is produced with the aid of the process of the invention, by (I) applying a thermally curable coating material comprising a curable mixture (A/B) to an uncoated or precoated substrate, to give a layer of the coating material, (II) curing the layer of the coating material on its own or together with at least one layer below it, composed of a different coating material, to give a coating, (III) applying an adhesive to the coating in the region in which the substrate is to be joined to the sheet via the coating and the adhesive layer, to give the layer of adhesive, and
(IV) joining the layer of adhesive to the sheet and subjecting the bond to curing, to give the adhesive layer.

Examples of suitable curable mixtures (A/B), substrates, and adhesives are those described above.

The coating material is preferably a conventional coating material based on organic solvents, an aqueous coating material, a substantially or entirely water-free and solvent-free liquid coating material (100% system) or finely divided solid coating material (powder coating material) or an aqueous suspension of finely divided solid particles (powder slurry), preferably a conventional coating material based on organic solvents, in particular a conventional coating material producible from a multicomponent system, in particular a two-component system. Preferably the coating material is a clearcoat material and the coating is a clearcoat. Examples of suitable coating materials of this kind and also the methods of their application and curing are known from German patent DE 102 02 819 C1, page 4 paragraph [0040] to page 5 paragraph [0055].

The layers of the other coating materials are preferably selected from the group consisting of primers, electrocoats, surfacer coats, and basecoats, preferably primers, electrocoats, surfacer coats, and basecoats of the kind used typically for producing multicoat automotive OEM finishes.

The coatings produced from layers of the other coating materials are preferably selected from the group consisting of primers, electrocoats, surfacer coats or antistonechip primer coats, and also basecoats.

For the inventive use and the process of the invention it is especially advantageous to use a mixture of the invention, in particular a clearcoat material of the invention.

The mixture of the invention comprises one of the above-described curable mixtures (A/B) and at least one thermally curable polyester (C).

The thermally curable polyester (C) is preferably hydrophobic (cf. Römpp Lexikon Lacke und Druckfarben, Georg Thieme Verlag, Stuttgart, N.Y., 1998, "Hydrophobicity") and contains hydroxyl groups as reactive functional groups for the thermal cure.

The polyesters (C) are customary and known compounds and can be prepared by the customary and known polycondensation processes from the starting products typically employed. Examples of suitable starting products are known from German patent application DE 199 48 004 A1, page 5 line 11 to page 6 line 21.

The mixtures of the invention may further comprise at least one additive (D) different from the above-described constituents (A), (B), and (C).

Preferably the additive (D) is selected from the group consisting of reactive and inert, oligomeric and polymeric, film-forming binders; crosslinking agents; reactive and inert, organic and inorganic solvents; compounds which can be activated with actinic radiation, especially UV radiation; organic and inorganic, colored and achromatic, optical effect, electrically conductive, magnetically shielding, and fluorescent pigments; transparent and opaque, organic and inorganic fillers; nanoparticles; stabilizers; UV absorbers, light stabilizers; free-radical scavengers; photoinitiators; free-radical polymerization initiators; dryers; devolatilizers; slip additives; polymerization inhibitors; defoamers; emulsifiers; wetting agents; coupling agents; flow control agents; film-forming auxiliaries; rheology control additives; and flame retardants.

More preferably the additive (D) is selected from the group consisting of thermally curable, oligomeric and polymeric, film-forming binders and crosslinking agents.

The solids content of the mixtures of the invention may vary very widely and may therefore be adapted optimally to the requirements of the case in hand. The solids content can be 100% by weight, i.e., the mixture of the invention contains no volatile constituents which escape in the course of the thermal cure. Where such volatile constituents are present, the solids content, based in each case on the mixture of the invention, is preferably 20% to 80% by weight, more preferably 25% to 70% by weight, and in particular 30% to 65% by weight.

The amount of the curable mixture (A/B) in the mixture of the invention may vary widely and may therefore be adapted outstandingly to the requirements of the case in hand. Preferably the mixture of the invention contains 0.1% to 10% by weight, in particular 0.5% to 8% by weight, based in each case on the solids of the mixture of the invention, of the curable mixture (A/B).

The amount of the polyester (C) in the mixture of the invention may also vary widely and may therefore be likewise adapted outstandingly to the requirements of the case in hand. Preferably the mixture of the invention contains 1% to 40% by weight, in particular 2% to 30% by weight, based in each case on the solids of the mixture of the invention, of polyester (C).

The mixtures of the invention are preferably water-free. This means that they contain water only in traces, if at all, which are introduced intentionally in the course of their preparation by the constituents and/or in the course of their preparation and/or handling via the air's humidity. The water content is preferably below the detection limits of the customary and known, qualitative and quantitative methods of determining water.

In terms of method the preparation of the mixtures of the invention has no peculiarities but instead takes place by the mixing and homogenizing of the above-described constituents with the aid of customary and known mixing processes and apparatus such as stirred tanks, agitator mills, extruders, compounders, Ultraturrax devices, in-line dissolvers, static mixers, micromixers, toothed-wheel dispersers, pressure release nozzles and/or microfluidizers, where appropriate in the absence of actinic radiation.

On account of their outstanding performance properties the mixtures of the invention can be put to numerous end uses, such as the production of coatings, adhesive layers, seals, moldings, and films. In particular they are used as part of the process of the invention for producing clearcoats of multicoat paint systems.

The clearcoats of the invention are produced by applying the mixtures of the invention to the substrates described above.

In terms of method, the application of the mixtures of the invention has no peculiarities but may instead take place by means of all customary and known application methods suitable for the particular mixture of the invention, such as extrusion, electrocoating, injecting, spraying, including powder spraying, knifecoating, brushing, pouring, dipping, trickling or rolling. Preference is given to employing extrusion and spray application methods, in particular spray application methods.

Following their application the mixtures of the invention are cured thermally in a conventional way.

The thermal cure takes place in general after a certain rest time or flashoff time. This may have a duration of 30 s to 2 h, preferably 1 min to 1 h, and in particular 1 to 45 min. The rest time serves, for example, for the flow and devolatilization of layers of the mixtures of the invention, and for the evaporation of volatile constituents such as any solvent present. Flashing off can be accelerated by an elevated temperature, but below that sufficient for curing, and/or by a reduced atmospheric humidity.

The thermal cure is accomplished with the aid for example of a gaseous, liquid and/or solid hot medium, such as hot air, heated oil or heated rolls, or of microwave radiation, infrared light and/or near-infrared (NIR) light. Heating is accomplished preferably in a forced-air oven or by exposure to IR and/or NIR lamps. Curing may also take place in stages. The thermal cure is accomplished preferably at temperatures from room temperature to 200° C., more preferably from room temperature to 180° C., and in particular from room temperature to 160° C.

The thermal cure may also be assisted by means of additional curing methods, using, where appropriate, the customary and known apparatus for curing, for example, with actinic radiation, in particular UV radiation.

The laminate of the invention, especially the laminate of the invention produced by means of the process of the invention, more particularly the laminate of the invention produced by means of the process of the invention using the mixture of the invention, exhibits numerous advantages. For instance, its performance properties are largely independent of the conditions prevailing during its production, particularly with regard to temperature and atmospheric humidity. It is durably strong even under extreme conditions and suffers no damage, such as cracks or delamination. In particular the laminate of the invention is stable and suffers no damage even at high and low temperatures, high and low atmospheric humidity, and also under conditions fluctuating rapidly between these extremes, of the kind which prevail in a tropical climate and in a desert climate, under high radiation intensity and with an intensive mechanical and chemical load. For these reasons it is especially suitable as a constituent of motor vehicle bodies, particularly the bodies of commercial vehicles and automobiles. On account of its particularly high quality it is suitable above all as a constituent of top-class automobiles.

EXAMPLES

Preparation Example 1

The Preparation of the Compound (B1)

A reaction vessel equipped with stirrer, reflux condenser, oil heating, and nitrogen inlet tube was charged with 456.38 parts by weight of a commercial polyisocyanate (Basonat® HI 100 from BASF Aktiengesellschaft) and 228 parts by weight of a commercial aromatic solvent mixture (Solventnaphta®). Added to this mixture, slowly and with stirring, were 815.62 parts by weight of N,N-bis(3-trimethoxysilylpropan-1-yl)amine (Dynasilan® 1124 from Degussa). Thereafter the reaction mixture was heated at 50° C. with stirring for two hours. After that time free isocyanate groups were no longer detectable by IR spectroscopy. The solution of the compound (B1) had a solids content of 84% to 85% by weight.

Preparation Example 2

The Preparation of the Compound (B2)

A reaction vessel equipped with stirrer, reflux condenser, oil heating, and nitrogen inlet tube was charged with 82 parts by weight of a commercial polyisocyanate (Vestanat® T from Degussa) and 82 parts by weight of a commercial aromatic solvent mixture (Solventnaphta®). Added to this mixture, slowly and with stirring, were 86 parts by weight of N-(3-trimethoxysilylpropan-1-yl)-N-n-butylamine (Dynasilan® 1189 from Degussa). Thereafter the reaction mixture was heated at 50° C. with stirring for two hours. After that time free isocyanate groups were no longer detectable by IR spectroscopy. The solution of the compound (B2) had a solids content of 52% to 53% by weight.

Preparation Example 3

The Preparation of the Curable Mixture (A/B/1) (Coupling Agent 1)

92 parts by weight of compound B2 from Preparation Example 2 were mixed with 2 parts by weight of dimethyl phosphite and the resulting mixture was then homogenized at room temperature for 10 minutes.

Preparation Example 4

The Preparation of the Curable Mixture (A/B/2) (Coupling Agent 2)

92 parts by weight of compound B1 from Preparation Example 1, 45 parts by weight of compound B2 from Preparation Example 2, 57 parts by weight of Solventnaphta® and 6 parts by weight of propylene glycol, were mixed with 8 parts by weight of diphenyl phosphite and the resulting mixture was then homogenized at room temperature for 10 minutes.

Preparation Example 5

The Preparation of a Hydroxy-Functional Methacrylate Copolymer (D)

In a pressure reactor flushed with nitrogen and equipped with a reflux condenser and stirrer, nitrogen was used to set an overpressure of 2.5 bar. The reactor was then charged with 28.238 parts by weight of Solventnaphtha®. The solvent was heated to 150° C. with stirring. At this temperature a mixture of 3.476 parts by weight of Solventnaphtha® and 1.023 parts by weight of DTBP peroxide was metered in at a uniform rate over 285 minutes. 15 minutes after the beginning of this feed, a mixture of 5.114 parts by weight of styrene, 17.378 parts by weight of tert-butyl acrylate, 20.446 parts by weight of 2-hydroxypropyl methacrylate, 7.815 parts by weight of n-butyl methacrylate, and 0.375 part by weight of acrylic acid was metered in over 240 minutes. After the end of the initiator feed the reaction mixture was polymerized at 150° C. for 120 minutes. Then the reaction mixture was cooled to 120° C. and blanketed with nitrogen. Polymerization was continued at this temperature until a solids content>59% by weight was reached (determination: 1 hour at 130° C.). Thereafter the solution of hydroxy-functional methacrylate copolymer (D) was cooled to room temperature.

Preparation Example 6

The Preparation of a Hydroxy-Functional Hydrophobic Polyester (C)

A nitrogen-filled reactor equipped with a stirrer and a packed column with overhead temperature measurement and water separator was charged with 22.6 parts by weight of hexahydrophthalic anhydride, 15.99 parts by weight of pentaerythritol, 9.41 parts by weight of ethylbutylpropane-1,3-diol, 18.56 parts by weight of isononanoic acid, and 0.8 part by weight of cyclohexane, in that order. The separating receiver was filled with a sufficient amount of cyclohexane. The reaction mixture was then heated so that the temperature in the reactor did not exceed 220° C. and the overhead column temperature did not exceed 85° C. At these temperatures the reaction mixture was stirred until an acid number of 17 mg KOH/g was reached. Subsequently the resulting hydroxy-functional hydrophobic polyester (C) was diluted with 22 parts by weight of Solventnaphtha®.

Preparation Example 7

The Preparation of a Rheological Assistant (D)

In a pressure reactor flushed with nitrogen and equipped with a reflux condenser and stirrer, nitrogen was used to set an overpressure of 2.5 bar. The reactor was then charged with 28 parts by weight of Solventnaphtha®. The solvent was heated to 160° C. with stirring. At this temperature a mixture of 4.02 parts by weight of Solventnaphtha® and 1.16 parts by weight of DTBP peroxide was metered in at a uniform rate over 4.75 hours. 15 minutes after the beginning of this feed, a mixture of 25.67 parts by weight of styrene, 22.3 parts by weight of n-butyl acrylate, 13.87 parts by weight of 2-hydroxypropyl methacrylate, 1.41 parts by weight of methacrylic acid, and 0.87 part by weight of lauryl methacrylate was metered in over 4 hours. After the end of the initiator feed the reaction mixture was polymerized at 160° C. for 120 minutes. Then the reaction mixture was cooled to room temperature and blanketed with nitrogen.

84.7 parts by weight of the methacrylate copolymer solution were admixed with 5.88 parts by weight of butyl acetate. The resulting solution was introduced into a reactor and admixed with 2.24 parts by weight of benzylamine, with stirring. Subsequently a mixture of 1.76 parts by weight of hexamethylene diisocyanate and 3.42 parts by weight of butyl acetate was metered in over 5 minutes, so that the temperature of the reaction mixture did not exceed 40° C. The resulting rheological assistant (D) had a solids content of 59% by weight and a viscosity at 23° C. of 800 mPas.

Examples 1 and 2 (Inventive)

The Preparation of Clearcoat Materials 1 (Example 1) and 2 (Example 2) and Production of Multicoat Paint Systems 1 (Example 1) and 2 (Example 2)

First of all, millbases 1 (Example 1) and 2 (Example 2) were prepared, by mixing the constituents listed in Table 1 and homogenizing the resulting mixtures.

TABLE 1

The composition of millbases 1 (Example 1) and 2 (Example 2)

| Constituent | Millbase (parts by weight) | |
|---|---|---|
| | 1 | 2 |
| Methacrylate copolymer (D) from Preparation Example 5 | 32.2 | 32.2 |
| Polyester (C) from Preparation Example 6 | 27.5 | 27.5 |
| Rheological assistant (D) (Setalux ® C 91756 VS-60 YA from Nuplex Resins) | 8.3 | 8.3 |
| Rheological assistant (D) from Preparation Example 7 | 9.3 | 9.3 |
| Butyl glycol acetate | 9 | 9 |
| Solventnaphtha ® | 1 | 1 |
| Methyl amyl ketone | 1.5 | 1.5 |
| Tinuvin ® 5248 (light stabilizer D from Ciba Specialty Chemicals) | 2.1 | 2.1 |
| Byk ® 325 (coatings additive D from Altana) | 0.1 | 0.1 |
| Butanol | 0.5 | 0.5 |
| Ethoxypropyl acetate | 3.4 | 3.4 |
| Butyl acetate | 4.3 | 4.3 |
| Coupling agent 2 from Preparation Example 4 | 2.5 | — |
| Coupling agent 1 from Preparation Example 3 | — | 2.5 |

Immediately prior to their application, the clearcoat materials 1 (Example 1) or 2 (Example 2) were prepared by mixing 100 parts by weight of each of millbase 1 or 2 with 33 parts by weight each of a curing agent solution consisting of 89.6% by weight of a commercial polyisocyanate (Basonat® HI 190 from BASF Aktiengesellschaft), 5.2% by weight of butyl acetate, and 5.2% by weight of Solventnaphtha®, and homogenizing the resulting mixtures.

Clearcoat materials 1 and 2 were applied to metal test panels each of which had been coated with a customary and known, cathodically deposited and thermally cured electrocoat, a customary and known, thermally cured surfacer coat, and a layer, predried at 80° C. for 10 minutes, of a commercially customary black aqueous basecoat material from BASF Coatings AG. The basecoat films and the clearcoat films were each cured together. This was done using the following conditions:
Series 1: 20 minutes at 140° C. and 2 weeks of aging;
Series 2: Three times 20 minutes at 140° C. (=Overbaking) and 2 weeks of aging;
Series 3: 30 minutes at 160° C. (=Overbaking) and 2 weeks of aging.

The resulting basecoats each had a film thickness of 7.5 μm and the clearcoats a film thickness of 40 μm. The resulting multicoat paint systems 1 (Example 1) and 2 (Example 2) were highly glossy and had an outstanding overall appearance.

As a result of the overbaking (series 2 and 3), however, the clearcoats were so to speak "baking-deadened", carrying the risk of significant impairment in their adhesion to adhesive layers located thereon.

The sheet bonding adhesion was determined as follows.

Adhesive strips were mounted on all of the test panels, transversely over the narrow side.

Using a triangular nozzle, a commercially customary glazing adhesive (EFTEC DA 300 from EFTEC, Switzerland) was applied in the form of a bead 10 mm wide and 150 mm long to two polyethylene film backings per test panel. The beads were allowed to undergo initial drying under standard climatic conditions for one minute. Thereafter the beads were transferred to the test panels. In each case the end of a bead was placed on the adhesive strip, so that, after curing, the beads could easily be gripped with tweezers and peeled off in order to implement the peel adhesion test. After the beads have been applied, spacers were placed on either side of the beads. Bonder panels were placed onto the polyethylene film reverse faces and the spacers. The beads were adjusted to a layer thickness of 5 mm by means of pressing by hand. The polyethylene films and the Bonder panels remained in the standard-climate chamber for curing for seven days at 23° C. and 50% relative humidity. After seven days, the polyethylene films and the Bonder panels were removed. The cured beads were gripped "at the top", i.e., at the points where they lay on the adhesive strip, using tweezers, and were peeled off from the adhesion surface at an angle of 90°. After a length of 10 mm had been peeled off in each case, the material in the fracture zone was cut with a knife down to the surface of the clearcoats, after which peeling was continued.

The separation areas were assessed visually. The critical factor here is for, as far as possible, complete cohesive fracture to take place in the bead, corresponding to maximum adhesion of the bead to the multicoat paint system. The adhesion was rated as follows:

| Adhesion | Rating |
|---|---|
| 100% | 5 |
| 75% | 4 |
| 50% | 3 |
| 25% | 2 |
| 0% | 1 |

It was found that in the case of the multicoat paint systems 1 and 2 of Examples 1 and 2 all series 1 to 3 resulted in a rating of 5, which underscored the outstanding coupling agent effect of coupling agents 1 and 2 of Preparation Examples 3 and 4.

Example C1 (Comparative)

The Preparation of Clearcoat Material C1 and Production of Multicoat Paint System C1

Example 1 was repeated, replacing the coupling agent from Preparation Example 4 by an equal amount of the silanized polyisocyanate from Preparation Example 2 (i.e., compound B2) without further additions of diphenyl phosphite. In the case of the tests relating to glazing bonding, a rating in each case of 3 was found after overbaking (3×20 min at 140° C. and also 30 min at 160° C.) and subsequent aging for 2 weeks, whereas the corresponding results of the formulations based on millbases 1 and 2 were evaluated, as described, with 5. This underscored the surprisingly high influence of the diphenyl phosphite on the bonding of glazing.

What is claimed is:

1. A method of making a laminate comprising at least one substrate, at least one coating, at least one adhesive layer, and at least one sheet, the method comprising employing a coupling agent in the laminate, the coupling agent comprising (A) at least one phosphonic diester and/or at least one diphosphonic diester and (B) at least one compound containing at least two condensable silane groups,
   wherein the coupling agent is employed in laminates comprising at least one substrate, at least one coating, at least one adhesive layer and at least one sheet,
   wherein the sheet is selected from the group consisting of planar, substantially planar, and three-dimensionally shaped, optically transparent moldings,
   wherein the compound (B) is prepared by reacting at least one compound of the general formula IX:

$$R^9(N{=}C{=}R^8)_q \qquad (IX),$$

in which the index q is an integer from 1 to 10 and the variable $R^9$ is at least monovalent organic radical and $R^8$ is an oxygen atom or a sulfur atom, with at least one compound of the general formula X:

$$H{-}R^{12}[{-}R^{13}]_n[{-}R^{14}({-}R^{15})_o]_p \qquad (X),$$

in which n is 0 or 1,
o is 1, 2 or 3,
p is 1 or 2, with the proviso that o=2 or 3 and/or p=2 if q=1;
$R^{12}$ is a divalent or trivalent atom selected from the group consisting of divalent linking atoms [$R^7$] and trivalent nitrogen atoms —N< and —N=, in which "=" symbolizes a double bond; or
a divalent or trivalent linking functional group selected from the group consisting of —NH—, —N(—$R^6$)— —NH—C(=$R^8$)—, —NH[—C(=$R^8$)—]$_2$, —NH—C(=$R^8$)—NH—, —NH—C(=$R^8$)—$R^7$—, —NH—C(=$R^8$)—$R^7$—, —$R^7$—N=, —$R^7$—NH—C(=$R^8$)—, and —NH—C(=$R^8$)—NH—N=C<, in which "—$R^8$" is as defined above, "—$R^7$—" is a divalent linking atom or divalent linking functional group, and $R^6$ is a monovalent inert organic radical;
$R^{13}$ is a monovalent inert organic radical $R^6$ or a group of the general formula VIII:

$$-R^{14}({-}R^{15})_o \qquad (VIII),$$

in which the index o is as defined above and the radicals $R^{14}$ and $R^{15}$ are as defined below;
$R^{14}$ is an at least divalent inert organic radical; and
$R^{15}$ is a silane group of the general formula V:

$$SiR^5_m R^6_{3-m} \qquad (V),$$

in which the index and the variables have the following definitions:
m is an integer from 1 to 3;
$R^5$ is a monovalent condensable atom or monovalent condensable organic radical; and
$R^6$ is as defined above.

2. The method of claim 1, wherein the coupling agent is in the at least one coating.

3. The method of claim 2, wherein the adhesive layer is located on a surface of the at least one coating.

4. The method of claim 1, wherein the sheet is selected from the group consisting of planar optically transparent moldings, substantially planar optically transparent moldings, and three-dimensionally shaped, optically transparent moldings.

5. The method of claim 4, wherein the moldings comprise materials selected from plastics and glass.

6. The method of claim 1, wherein the phosphonic diesters and the diphosphonic diesters (A) are selected from the group consisting of acyclic phosphonic diesters, cyclic phosphonic diesters, acyclic diphosphonic diesters, cyclic diphosphonic diesters, and cyclic-acyclic diphosphonic diesters.

7. The method of claim 6, wherein the phosphonic diesters (A) have at least one formula selected from the group consisting of general formula (I), general formula (II), general formula (III), and general formula (IV), wherein general formula (I) is:

$$\begin{matrix} R^1{-}O \\ R^2{-}O \end{matrix} {>} P(O)H; \qquad (I)$$

general formula (II) is:

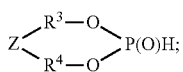  (II)

general formula (III) is:

(R$^1$—O)(O)PH—O—PH(O)(O—R$^2$)  (III);

and general formula (IV) is:

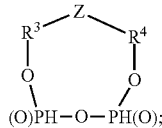  (IV)

and wherein the variables have the following definitions:

R$^1$ and R$^2$ are identical to or different from one another and are selected from the group consisting of substituted and unsubstituted alkyl- having 1 to 20 carbon atoms, cycloalkyl- having 3 to 20 carbon atoms and aryl- having 5 to 20 carbon atoms, the hyphen symbolizing in each case the covalent bond between a carbon atom of the radical R$^1$ or R$^2$ and the oxygen atom of the O—P group;

substituted and unsubstituted alkylaryl-, arylalkyl-, alkylcycloalkyl-, cycloalkylalkyl-, arylcycloalkyl-, cycloalkylaryl-, alkylcycloalkylaryl-, alkyl arylcycloalkyl-, arylcycloalkyl alkyl-, arylalkylcycloalkyl-, cycloalkylalkylaryl-, and cycloalkylarylalkyl-, the alkyl, cycloalkyl, and aryl groups therein each containing the aforementioned number of carbon atoms, and the hyphen symbolizing in each case the covalent bond between a carbon atom of the radical R$^1$ and R$^2$ and the oxygen atom of the O—P group; and substituted and unsubstituted radical- of the aforementioned kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group;

R$^3$ and R$^4$ are identical to or different from one another and are selected from the group consisting of substituted and unsubstituted divalent alkyl- having 1 to 20 carbon atoms, cycloalkyl- having 3 to 20 carbon atoms and aryl- having 5 to 20 carbon atoms, the hyphen symbolizing in each case the covalent bond between a carbon atom of the radical R$^3$ or R$^4$ and the oxygen atom of the O—P group;

substituted and unsubstituted divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl, and aryl groups therein each containing the aforementioned number of carbon atoms, and the hyphen symbolizing in each case the covalent bond between a carbon atom of the radical R$^3$ and R$^4$ and the oxygen atom of the O—P group; and substituted and unsubstituted divalent radical- of the aforementioned kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group; and Z is a covalent bond between an atom of the radical R$^3$ and an atom of the radical R$^4$ or a divalent linking group selected from the group consisting of oxygen atom, substituted and unsubstituted sulfur atom, substituted nitrogen atom, substituted phosphorus atom, substituted silicon atom, substituted and unsubstituted alkyl having 1 to 10 carbon atoms, cycloalkyl having 3 to 10 carbon atoms, and aryl having 5 to 10 carbon atoms, these radicals being free from heteroatoms or containing at least one heteroatom selected from the group consisting of oxygen atom, sulfur atom, nitrogen atom, phosphorus atom, and silicon atom.

8. The method of claim 1, wherein the coupling agent contains at least one phosphonic diester and/or at least one diphosphonic diester (A) in an amount of 1% to 40% by weight, based on the solids of a curable mixture (A/B).

9. The method of claim 1, wherein the coupling agent contains at least one compound (B) in an amount of 60% to 99% by weight, based on the solids of a curable mixture (A/B).

10. The method of claim 1, wherein the monovalent condensable atom R$^5$ is selected from the group consisting of hydrogen atom, fluorine atom, chlorine atom, and bromine atom; and the monovalent condensable organic radical R$^5$ is selected from the group consisting of groups of the general formula VI:

—R$^7$—R$^6$  (VI), in which the variable R$^7$ is a divalent linking atom or a divalent linking functional group and R$^6$ is as defined above.

11. The method of claim 10, wherein the divalent linking atom R$^7$ is an oxygen atom or a sulfur atom or is selected from the group consisting of —C(=R$^8$)—, —R$^{16}$—C(=R$^8$)—, —C(=R$^8$)—R$^{16}$, NH—, and —N(—R$^6$)—, in which the variable R$^8$ is a divalent atom, "=" symbolizing a double bond, R$^{16}$ is an oxygen or sulfur atom and the covalent bond symbolized by the left-hand outer supplementary hyphen links the group of the general formula VI to the silicon atom of the group of the general formula V.

12. The method of claim 1, wherein the compound (B) has the general formula VII:

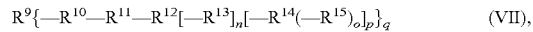  (VII), in which the indices and the variables have the following definitions:

n is 0 or 1;

o is 1, 2 or 3;

P is 1 or 2;

q is an integer from 1 to 10, with the proviso that o=2 or 3 and/or p=2 if q=1;

R$^9$ is an at least monovalent inert organic radical, with the proviso that o=2 or 3 and/or p=2 if R$^9$=monovalent organic radical;

R$^{10}$ is a group —NH— or a divalent linking atom, with the proviso that n=0 and p=1 if R$^{10}$=divalent linking atom;

R$^{11}$ is a group —C(=R$^8$)—, in which "=R$^8$" is selected from the group consisting of oxygen atoms and sulfur atoms;

$R^{12}$ is a divalent or trivalent atom selected from the group consisting of divalent linking atoms and trivalent nitrogen atoms —N< and —N=, in which "=" symbolizes a double bond; or a divalent or trivalent linking functional group selected from the group consisting of —NH—, —N(—R$^6$)—NH—C(=R$^8$)—, —NH[—C(=R$^8$)—]$_2$, —NH—C(=R$^8$)—NH—, —NH—C(=R$^8$)—R$^7$—, —NH—C(=R$^8$)—NH—C(=R$^8$)—R$^7$—, —R$^7$—N=, —R$^7$—NH—C(=R$^8$)—, and —NH—C(=R$^8$)—NH—N=C<, in which "—R$^7$—" is an oxygen atom or a sulfur atom, "—R$^6$—" is a monovalent inert organic radical and "=R$^8$", is as defined above;

in which "—" in "—R$^{12}$" of the general formula VII symbolizes a covalent bond linking the divalent or trivalent atom or the divalent linking functional group to the carbon atom of the group $R^{11}$;

$R^{13}$ is a monovalent inert organic radical $R^6$ or a group of the general formula VIII:

  (VIII), in which the index o is as defined above and the radicals $R^{14}$ and $R^{15}$ are as defined below;

$R^{14}$ is an at least divalent inert organic radical; and
$R^{15}$ is a silane group of the general formula V:

  (V), in which the index and the variables have the following definitions:

m is an integer from 1 to 3;
$R^5$ is a monovalent condensable atom or monovalent condensable organic radical; and
$R^6$ is a monovalent inert organic radical.

13. The laminate made by the method of claim 1.
14. A process for producing a laminate comprising
(I) applying a first thermally curable coating material comprising a coupling agent to a substrate, the coupling agent comprising (A) at least one phosphonic diester and/or at least one diphosphonic diester and (B) at least one compound containing at least two condensable silane groups, to give a first coating material layer,
(II) curing the first coating material layer to give at least one coating,
(III) applying an adhesive to the at least one coating in a region in which the substrate is to be joined to a sheet via the at least one coating and the adhesive layer, to give an adhesive layer, and
(IV) joining the adhesive layer to the sheet and curing the adhesive layer to give the laminate,
wherein the coupling agent is employed in laminates comprising at least one substrate, at least one coating, at least one adhesive layer and at least one sheet,
wherein the sheet is selected from the group consisting of planar, substantially planar, and three-dimensionally shaped, optically transparent moldings,
wherein the compound (B) is prepared by reacting at least one compound of the general formula IX:

  (IX), in which the index q is an integer from 1 to 10 and the variable $R^9$ is at least monovalent organic radical and $R^8$ is an oxygen atom or a sulfur atom, with at least one compound of the general formula X:

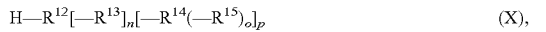  (X), in which n is 0 or 1,
o is 1, 2 or 3,
p is 1 or 2, with the proviso that o=2 or 3 and/or p=2 if q=1;
$R^{12}$ is a divalent or trivalent atom selected from the group consisting of divalent linking atoms [$R^7$] and trivalent nitrogen atoms —N< and —N=, in which "=" symbolizes a double bond; or a divalent or trivalent linking functional group selected from the group consisting of —NH—, —N(—R$^6$)—NH—C(=R$^8$)—, —NH[—C(=R$^8$)—]$_2$, —NH—C(=R$^8$)—NH—, —NH—C(=R$^8$)—R$^7$—, —NH—C(=R$^8$)—NH—C(=R$^8$)—R$^7$—, —R$^7$—N=, —R$^7$—NH—C(=R$^8$)—, and —NH—C(=R$^8$)—NH—N=C<, in which "=R$^8$" is as defined above, "—R$^7$—" is a divalent linking atom or divalent linking functional group, and $R^6$ is a monovalent inert organic radical; $R^{13}$ is a monovalent inert organic radical $R^6$ or a group of the general formula VIII:

  (VIII), in which the index o is as defined above and the radicals $R^{14}$ and $R^{15}$ are as defined below;

$R^{14}$ is an at least divalent inert organic radical; and
$R^{15}$ is a silane group of the general formula V:

  (V), in which the index and the variables have the following definitions:

m is an integer from 1 to 3;
$R^5$ is a monovalent condensable atom or monovalent condensable organic radical; and
$R^6$ is as defined above.

15. The process of claim 14, wherein first thermally curable coating material is applied to a precoated substrate coated with a second coating material selected from the group consisting of primer, electrocoat layers, surfacer layers, basecoat layers, and mixtures thereof.

16. A thermally curable coating material comprising
a coupling agent comprising
(A) at least one phosphonic diester and/or at least one diphosphonic diester and
(B) at least one compound containing at least two condensable silane groups
and
at least one thermally curable polyester (C),
wherein the coupling agent is employed in laminates comprising at least one substrate, at least one coating, at least one adhesive layer and at least one sheet,
wherein the sheet is selected from the group consisting of planar, substantially planar, and three-dimensionally shaped, optically transparent moldings,
wherein the compound (B) is prepared by reacting at least one compound of the general formula IX:

  (IX), in which the index q is an integer from 1 to 10 and the variable $R^9$ is at least monovalent organic radical and $R^8$ is an oxygen atom or a sulfur atom, with at least one compound of the general formula X:

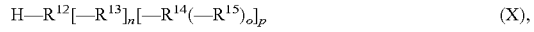  (X), in which n is 0 or 1,
o is 1, 2 or 3,
p is 1 or 2, with the proviso that o=2 or 3 and/or p=2 if q=1;
$R^{12}$ is a divalent or trivalent atom selected from the group consisting of divalent linking atoms [$R^7$] and trivalent nitrogen atoms —N< and —N=, in which "=" symbolizes a double bond; or a divalent or trivalent linking functional group selected from the group consisting of —NH—, —N(—R$^6$)— —NH—C(=R$^8$)—, —NH[—C(=R$^8$)—]$_2$, —NH—C(=R$^8$)—NH—, —NH—C(=R$^8$)—R$^7$—, —NH—C(=R$^8$)—NH—C(=R$^8$)—R$^7$—, —R$^7$—NH—, —R$^7$—NH—C(=R$^8$)—, and —NH—C(=R$^8$)—NH—N=C<, in which "—R$^8$" is as defined above, "—R$^7$—" is a divalent linking atom or divalent linking functional group, and R$^6$ is a monovalent inert organic radical; R$^{13}$ is a monovalent inert organic radical R$^6$ or a group of the general formula VIII:

   (VIII), in which the index o is as defined above and the radicals R$^{14}$ and R$^{15}$ are as defined below;

R$^{14}$ is an at least divalent inert organic radical; and

R$^{15}$ is a silane group of the general formula V:

   (V), in which the index and the variables have the following definitions:

m is an integer from 1 to 3;

R$^5$ is a monovalent condensable atom or monovalent condensable organic radical; and R$^6$ is as defined above.

17. The thermally curable mixture of claim 16, comprising the coupling agent in an amount, based on the thermally curable mixture, of 0.1% to 10% by weight.

* * * * *